(12) United States Patent
Halberstadt et al.

(10) Patent No.: US 8,095,570 B2
(45) Date of Patent: Jan. 10, 2012

(54) DECORATED MODEL ARCHITECTURE FOR EFFICIENT MODEL-DRIVEN APPLICATION DEVELOPMENT

(75) Inventors: Benjamin Halberstadt, Jerusalem (IL); Efrat Hexter, Beit Shemesh (IL); Yehuda Kossowsky, Beit Shemesh (IL); Boris Melamed, Jerusalem (IL); Ilan Prager, Beit Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 1050 days.

(21) Appl. No.: 11/945,015

(22) Filed: Nov. 26, 2007

(65) Prior Publication Data

US 2009/0138844 A1    May 28, 2009

(51) Int. Cl.
*G06F 17/30* (2006.01)
(52) U.S. Cl. ...................................... 707/803
(58) Field of Classification Search .............. 707/2, 791, 707/803; 709/203
See application file for complete search history.

(56) References Cited

U.S. PATENT DOCUMENTS

| 7,000,219 B2 | 2/2006 | Barrett et al. |
| 2004/0015542 A1* | 1/2004 | Anonsen et al. .............. 709/203 |
| 2004/0181538 A1 | 9/2004 | Lo et al. |
| 2006/0136865 A1 | 6/2006 | Lin et al. |

FOREIGN PATENT DOCUMENTS

EP    1577755 A2    9/2005

OTHER PUBLICATIONS

R. Heckel et al, "Relating functional requirements and software architecture: separation and consistency of concerns", Journal of Software Maintenance and Evolution Research and Practice, v 14, n 5, Sep.-Oct. 2002, 371-88.
G. Voulalas et al., "A framework for the development and deployment of evolving applications: elaborating on the model driven architecture towards a change-resistant development framework", ICSOFT 2006. Proceedings of the First International Conference on Software and Data Technologies, 2006, 8 pp Abstract only.

(Continued)

*Primary Examiner* — Etienne Leroux
(74) *Attorney, Agent, or Firm* — Lee Law, PLLC; Christopher B. Lee

(57) ABSTRACT

A method for implementing a model-driven architecture, including defining a principal model having a plurality of classes, references, attributes, and associations between any of the classes, the model configured to facilitate the automatic generation of at least one resource for use by a computer-executable application, where a change to the principal model subsequent to performing the automatic generation requires the automatic generation be performed again in order to effect the change for use by the application, defining a decoration model having a class, reference, and attribute for any corresponding one of the primary model classes, references, and attributes, where a change to the decoration model subsequent to performing the automatic generation does not require the automatic generation be performed again in order to effect the change for use by the application, mapping the decoration model to the principal model, and storing both of the models on a computer-readable medium.

5 Claims, 5 Drawing Sheets

OTHER PUBLICATIONS

Florida Estrella, et al., Meta-Data Objects as the Basis for System Evolution, 2001 Proceedings of the Second International Conference on Advances in Web-Age Information Management, Book chapter: Lecture Notes in Computer Science, Jul. 2001, pp. 390-399 (numbered as pp. 1-10 in attached reference, plus 1 citation page), Springer-Verlag London, United Kingdom.

V. Englebert, et al., Attribute-Based Refinement of Software Architectures, 2004 Proceedings of Fourth Working IEEE/IFIP Conference on Software Architecture, Jun. 12-15, 2004, pp. 301-304 (plus 1 citation page), IEEE, Published on the World Wide Web.

United States Patent and Trademark Office, Office Action for U.S. Appl. No. 11/945,046, Dec. 9, 2010, pp. 1-11, Alexandria, VA, USA.

United States Patent and Trademark Office, Office Action for U.S. Appl. No. 11/945,046, Apr. 26, 2011, pp. 1-18, Alexandria, VA, USA.

* cited by examiner

DECORATED MODEL ARCHITECTURE FOR EFFICIENT MODEL-DRIVEN APPLICATION DEVELOPMENT

RELATED APPLICATION

Commonly-owned and co-pending U.S. patent application having Ser. No. 11/945,046, (filed concurrently herewith), titled "Model Augmentation in a Model-Driven Application Development Environment."

FIELD OF THE INVENTION

The present invention relates to model-driven application development.

BACKGROUND OF THE INVENTION

With the advent of modeling methodologies such as the Unified Modeling Language (UML), developers of computer-based applications have been able to create system models and then employ tools that use the models to automatically generate application resources such as application programming interface (API) software for creating, accessing and modifying instances of model classes, as well as aspects of the persistence layer of an application, such as database structures. Unfortunately, after generating these resources using a model, any changes to the model requires that the resources be generated once again in order to effect the changes within the computer-based application.

SUMMARY OF THE INVENTION

The present invention provides a decorated model architecture for efficient model-driven application development that allows for a model to be changed in some instances without need for regenerating application resources.

In one aspect of the present invention a method is provided for implementing a model-driven architecture, the method including defining a principal model having a plurality of classes, references, attributes, and associations between any of the classes, where the model is configured to facilitate the automatic generation of at least one resource for use by a computer-executable application, and where a change to the principal model subsequent to performing the automatic generation requires that the automatic generation be performed again in order to effect the change for use by the application, defining a decoration model having a class, reference, and attribute for any corresponding one of the primary model classes, references, and attributes, where a change to the decoration model subsequent to performing the automatic generation does not require that the automatic generation be performed again in order to effect the change for use by the application, mapping the decoration model to the principal model, and storing both of the models on a computer-readable medium.

In another aspect of the present invention the method further includes defining in the principal model a class representing a package of any of the classes, references, and attributes of the decoration model.

In another aspect of the present invention a method is provided for using a decoration model in an application environment, the method including providing a computer-executable application with access to resources generated using a principal model, instantiating a decoration model associated with the principal model for use by the application, and providing the application with access to an object of the decoration model responsive to a request by the application to access an object of the principal model where the decoration model object corresponds to the principal model object.

In another aspect of the present invention the method further includes receiving a call from the application to a method defined in the principal model object, and passing the call from the decoration model object to the principal model object.

In another aspect of the present invention the method further includes receiving a call from the application to a method defined in the decoration model object, and servicing the call at the decoration model object.

In another aspect of the present invention the method further includes making the instantiated decoration model globally accessible to a plurality of the applications, for each request by any of the applications to access an object associated with either the principal model or the decoration model creating a new thread to handle the request, assigning the decoration model to a thread-local variable in the new thread, and servicing any thread-internal code function calls to access the decoration model object via the thread-local variable of its thread, making a change to the decoration model available to new threads by starting a new thread that reads the changed decoration model, instantiating the changed decoration model, and deserializing the changed decoration model into its own thread-local variable, and replacing the globally accessible decoration model with the changed decoration model while any of the applications are executed.

In another aspect of the present invention the method further includes forcing any new incoming requests from the applications to wait until the globally accessible decoration model is replaced by the changed model, and assigning the changed decoration model to thread-local variables of the new requests after the changed decoration model is instantiated.

In another aspect of the present invention the method further includes checking for pointer equality between any of the thread-local variables and the globally accessible decoration model during the post-processing of any of the requests, and displaying a message if the pointers are not the same.

In another aspect of the present invention a system is provided for implementing a model-driven architecture, the system including a model builder configured to facilitate the definition of a principal model having a plurality of classes, references, attributes, and associations between any of the classes, where the model is configured to facilitate the automatic generation of at least one resource for use by a computer-executable application, and where a change to the principal model subsequent to performing the automatic generation requires that the automatic generation be performed again in order to effect the change for use by the application, a decoration model having a class, reference, and attribute for any corresponding one of the primary model classes, references, and attributes, where a change to the decoration model subsequent to performing the automatic generation does not require that the automatic generation be performed again in order to effect the change for use by the application, and a mapping of the decoration model to the principal model, and means for storing both of the models on a computer-readable medium.

In another aspect of the present invention the model builder is configured to facilitate the definition in the principal model a class representing a package of any of the classes, references, and attributes of the decoration model.

In another aspect of the present invention a system is provided for using a decoration model in an application environment, the system including a principal model stored on a computer-readable medium, a decoration model stored on a computer-readable medium, and a computer configured to host a computer-executable application with access to resources generated using the principal model, instantiate the decoration model associated with the principal model for use by the application, and provide the application with access to an object of the decoration model responsive to a request by the application to access an object of the principal model where the decoration model object corresponds to the principal model object.

In another aspect of the present invention the computer is configured to receive a call from the application to a system defined in the principal model object, and pass the call from the decoration model object to the principal model object.

In another aspect of the present invention the computer is configured to receive a call from the application to a system defined in the decoration model object, and service the call at the decoration model object.

In another aspect of the present invention the computer is configured to make the instantiated decoration model globally accessible to a plurality of the applications, for each request by any of the applications to access an object associated with either the principal model or the decoration model create a new thread to handle the request, assign the decoration model to a thread-local variable in the new thread, and service any thread-internal code function calls to access the decoration model object via the thread-local variable of its thread, make a change to the decoration model available to new threads by starting a new thread that reads the changed decoration model, instantiating the changed decoration model, and deserializing the changed decoration model into its own thread-local variable, and replace the globally accessible decoration model with the changed decoration model while any of the applications are executed.

In another aspect of the present invention the computer is configured to force any new incoming requests from the applications to wait until the globally accessible decoration model is replaced by the changed model, and assign the changed decoration model to thread-local variables of the new requests after the changed decoration model is instantiated.

In another aspect of the present invention the computer is configured to check for pointer equality between any of the thread-local variables and the globally accessible decoration model during the post-processing of any of the requests, and display a message if the pointers are not the same.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
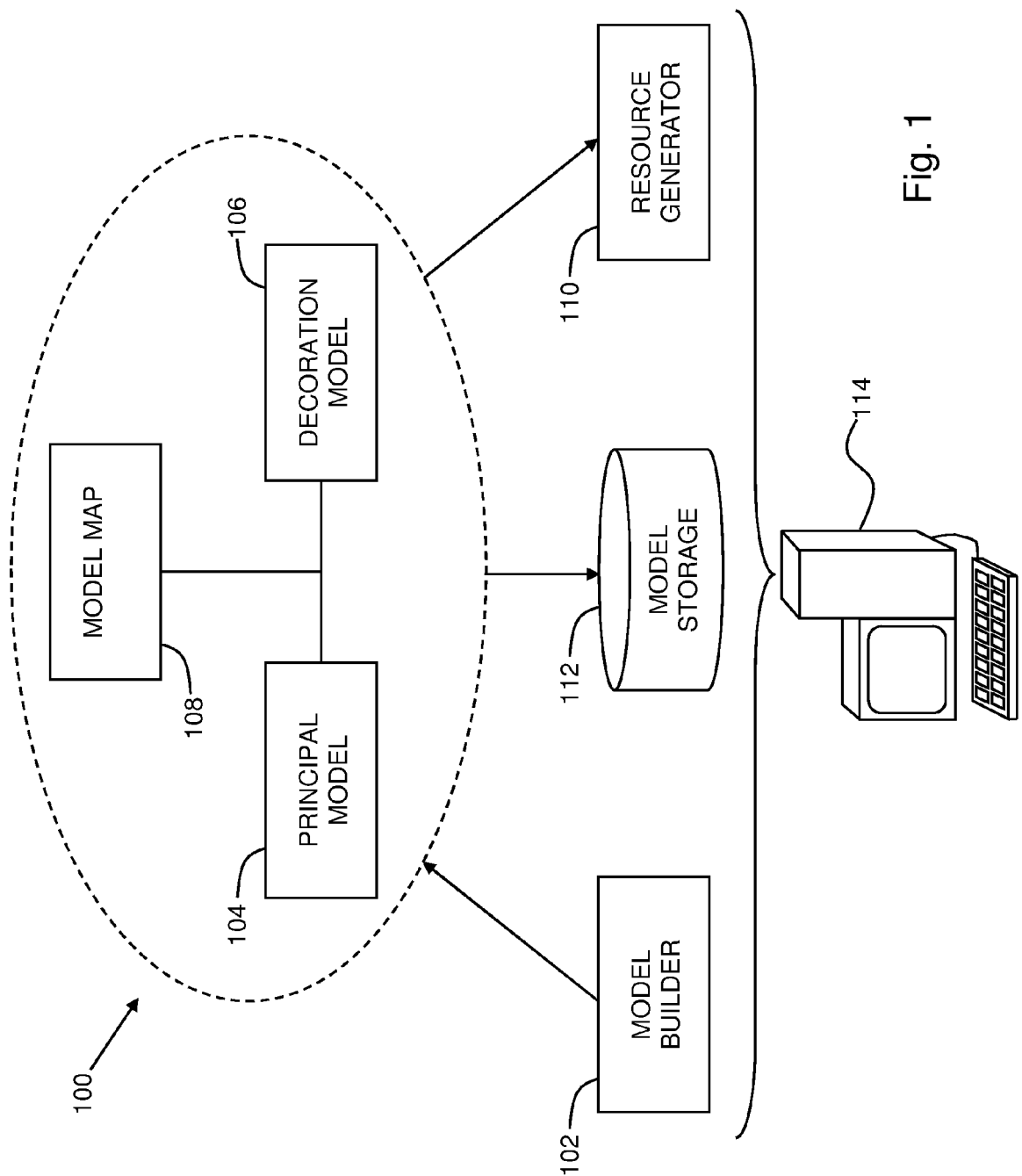
FIG. 1 is a simplified conceptual illustration of system for model-driven application development, constructed and operative in accordance with an embodiment of the present invention.

Reference is now made to FIG. 1 which is a simplified conceptual illustration of system for model-driven application development, constructed and operative in accordance with an embodiment of the present invention. In the system of FIG. 1, a model, generally designated 100 and bounded by dashed lines, is shown. Model 100 is typically constructed using a model builder 102 employing any known modeling technology, such as the Unified Modeling Language (UML), that supports classes, such as of an enterprise IT infrastructure or other system, and associations between the classes. Model 100 is configured to facilitate the automatic generation of one or more resources, such as by a resource generator 110, for use by one or more computer-executable applications. Such resources may be associated with what is referred to in modeling as the persistence layer, which includes schema elements including tables, columns, foreign keys, and indexes, or may be associated with the API, as is known in the art. Model 100 is divided into a principal model 104, a decoration model 106, and a model map 108 that maps between principal model 104 and decoration model 106. Principal model 104 is configured to include anything that, when added to, deleted from, or modified within principal model 104 subsequent to automatically generating the resources, would again require the automatic generation of the resources in order to effect the change for use by an application. Conversely, decoration model 106 is configured to include anything that, when added to, deleted from, or modified within decoration model 106 subsequent to automatically generating the resources, would not require the automatic generation of the resources in order to effect the change for use by an application.

Model 100 is preferably stored in a model storage 112, which may be computer memory, magnetic storage, or any other suitable information storage medium. Model 100 may be stored in storage 112 in any suitable format, such as in a relational database (RDB) or object-oriented database (OODB). Any of the elements shown in FIG. 1 are preferably executed by or otherwise accessible to a computer 114.

Principal model 104 preferably includes elements for storing decoration model 106, such as a via "DecorationModel" class representing a package of the items in decoration model 106. There is preferably one model partition per package, and each decoration model is preferably serialized, such as an XML document.

Figure 2:
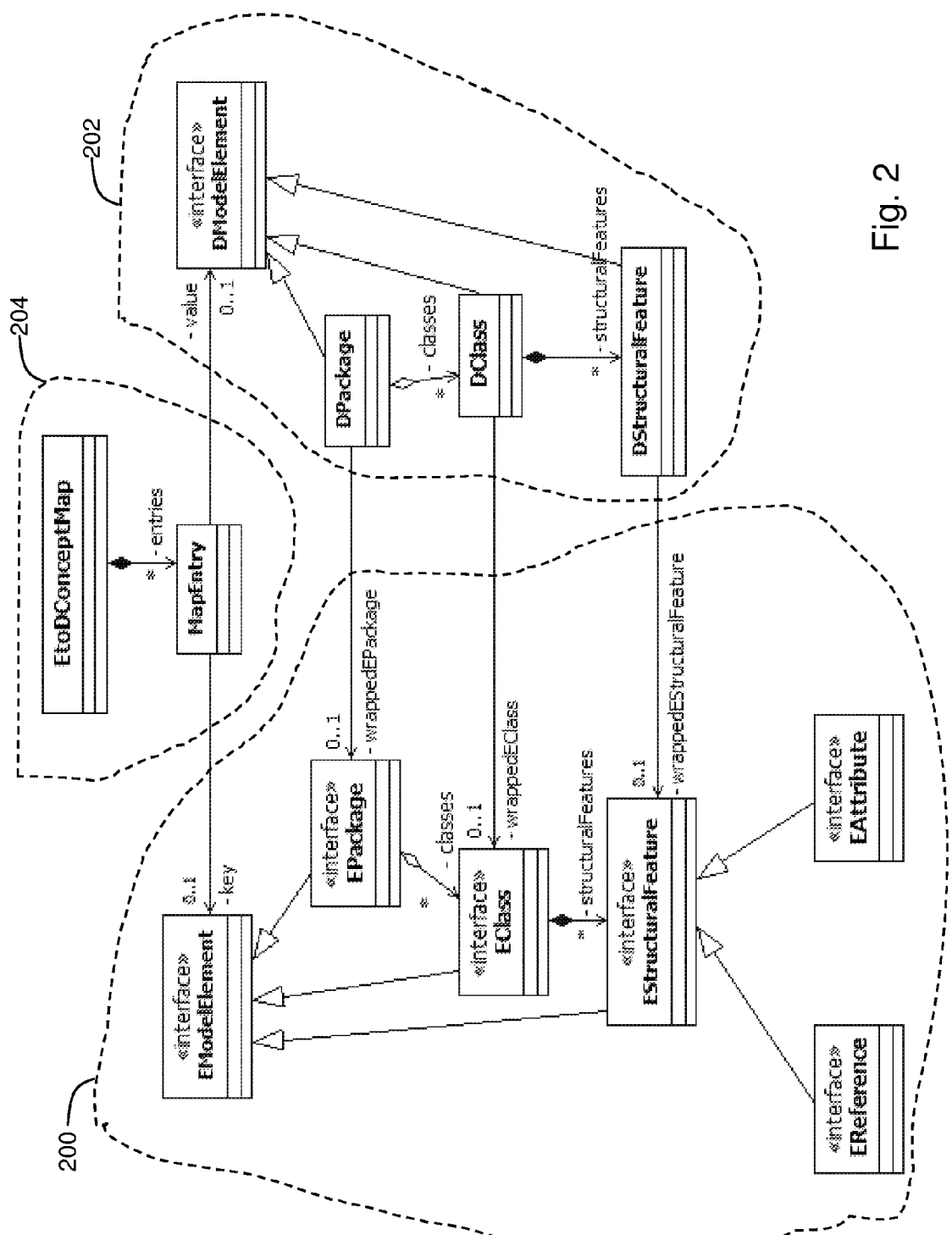
FIG. 2, which is a simplified illustration of an exemplary implementation of model 100 of FIG. 1, constructed and operative in accordance with an embodiment of the present invention.

Reference is now made to FIG. 2, which is a simplified illustration of an exemplary implementation of model 100 of FIG. 1, constructed and operative in accordance with an embodiment of the present invention. In FIG. 2, a principal model 200 is shown having various modeled items. A corresponding item is created in a decoration model 202 for one or more of the items in principal model 200. One or more items may then be attached to any of the items in decoration model 202, rather than in principal model 200, where their addition to, modification in, and/or subsequent deletion from decoration model 202 will not require that resources that were previously automatically generated using principal model 200 be subsequently regenerated due to the addition, modification, and/or deletion. Direct association links are preferably used for navigating from items in decoration model 202 to items in principal model 200, whereas a model map 206 is preferably used for navigating in the opposite direction.

Figure 3:
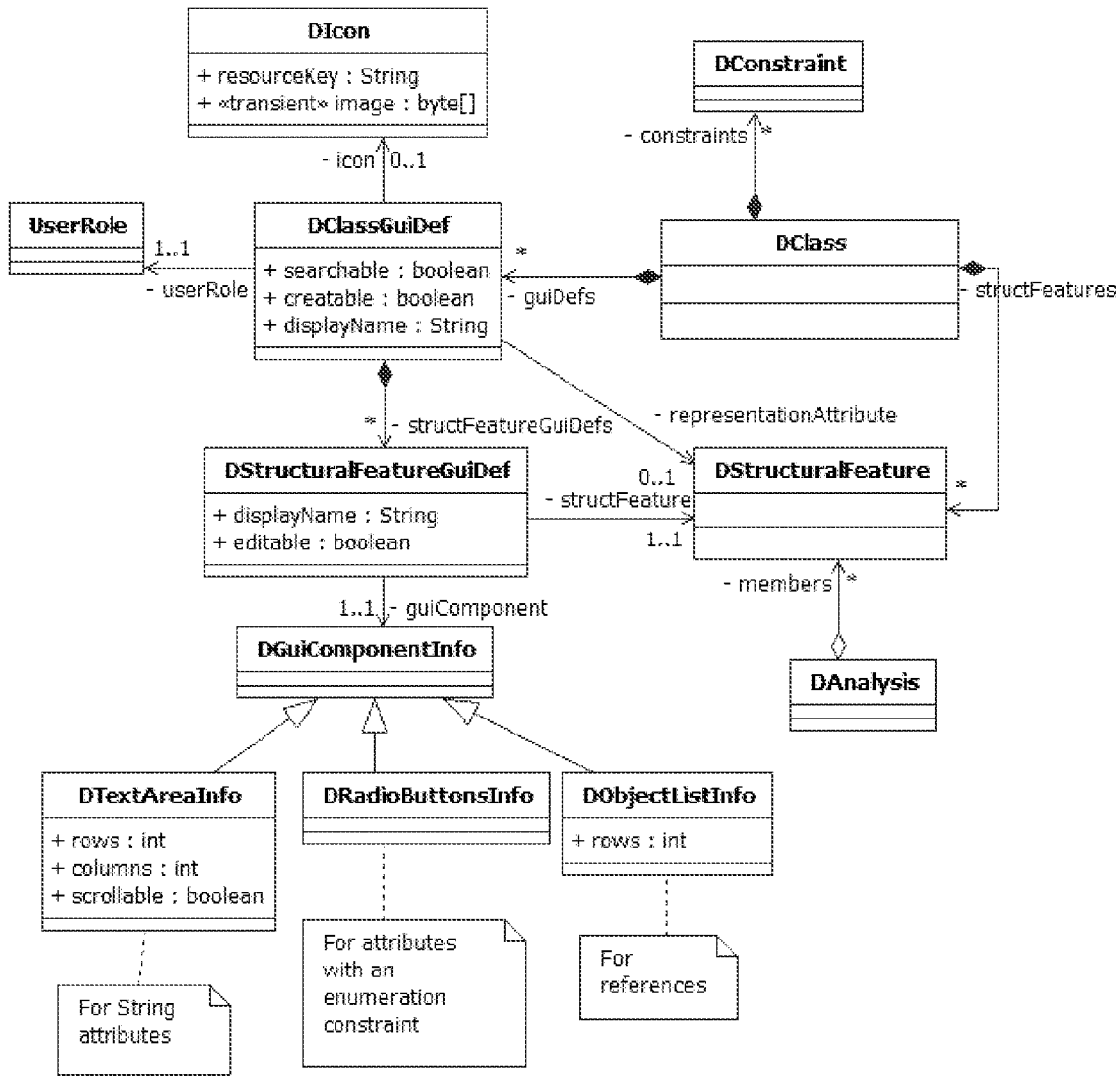
FIG. 3, which is a simplified illustration of an exemplary implementation of decoration model 106 of FIG. 1, constructed and operative in accordance with an embodiment of the present invention.

Reference is now made to FIG. 3, which is a simplified illustration of an exemplary implementation of decoration model 106 of FIG. 1, constructed and operative in accordance with an embodiment of the present invention. In FIG. 3 a decoration model is shown for aspects of a GUI interface in which classes and associations/attributes are decorated by detailed GUI presentation definitions, such as where there is one per user role, application/service-level constraints, and analysis logic definitions. For the sake of clarity, DPackage and DPackageGuiDef are not shown. DClass and DStructuralFeature are shown having been generated for each corresponding EClass/EStructuralFeature of a corresponding principal model. Instantiation of various concepts may be optional in a given decoration model, such as where a DClass has no DClassGuiDef for a certain UserRole and will therefore be invisible in the GUI layer for a user with that role.

Items in the decoration model of FIG. 3 may be created, edited and deleted without affecting a related principal model and without requiring regeneration of resources defined by the principal model. For example, a user may set a different display name for a class or attribute in the decoration model, although DClass and DStructuralFeature items in the decoration model that correspond to EClass/EStructuralFeature items in the principal model ought not be deleted.

The following guidelines may be employed when deciding what model items should be included in a principal model and what model items should be included in a decoration model. Model items that generally have, and should have, impact on resources that are generated based on a model should be included in a principal model, whereas model items that generally do not, or should not, have impact on resources that are generated based on a model should be included in a decoration model. Model builder 102 (FIG. 1) may be configured to recognize model items that do not impact generated resources and automatically place such items into a decoration model. These guidelines may be understood by way of example with regard to the persistence layer of an application environment in which database schema and an O/R mapping are generated using a model. In this example, model items that do not impact the generation of these resources include annotations that control display and business logic, and thus these items may be included within a decoration model. Model items that do impact the generation of these resources include classes, references, attributes, and annotations that control aspects of the persistence layer, such as indexes. Some model items may be included within a decoration model although they would otherwise impact resource generation, such as classes, references and attributes whose instances or values can be derived from other data. Thus, for example, where the attribute Person.fullName can be derived from Person.firstName and Person.lastName, the derived attribute may be included within a principal model, such as where the attribute values for Person.fullName are meant to be stored in a database. The responsibility to insert and update the values for Person.fullName would lie with the applications that populate Person data. Although including Person.fullName in a principal model may be convenient for authors of reporting applications, doing so results in data redundancy, performance costs owing to insertion time and table size, as well as the need to regenerate the schema and upgrade instances when the name or type of Person.fullName is changed. Alternatively, by placing Person.fullName in a decoration model, the responsibility for calculating the values for Person.fullName lie with applications that retrieve Person data.

Figure 4:
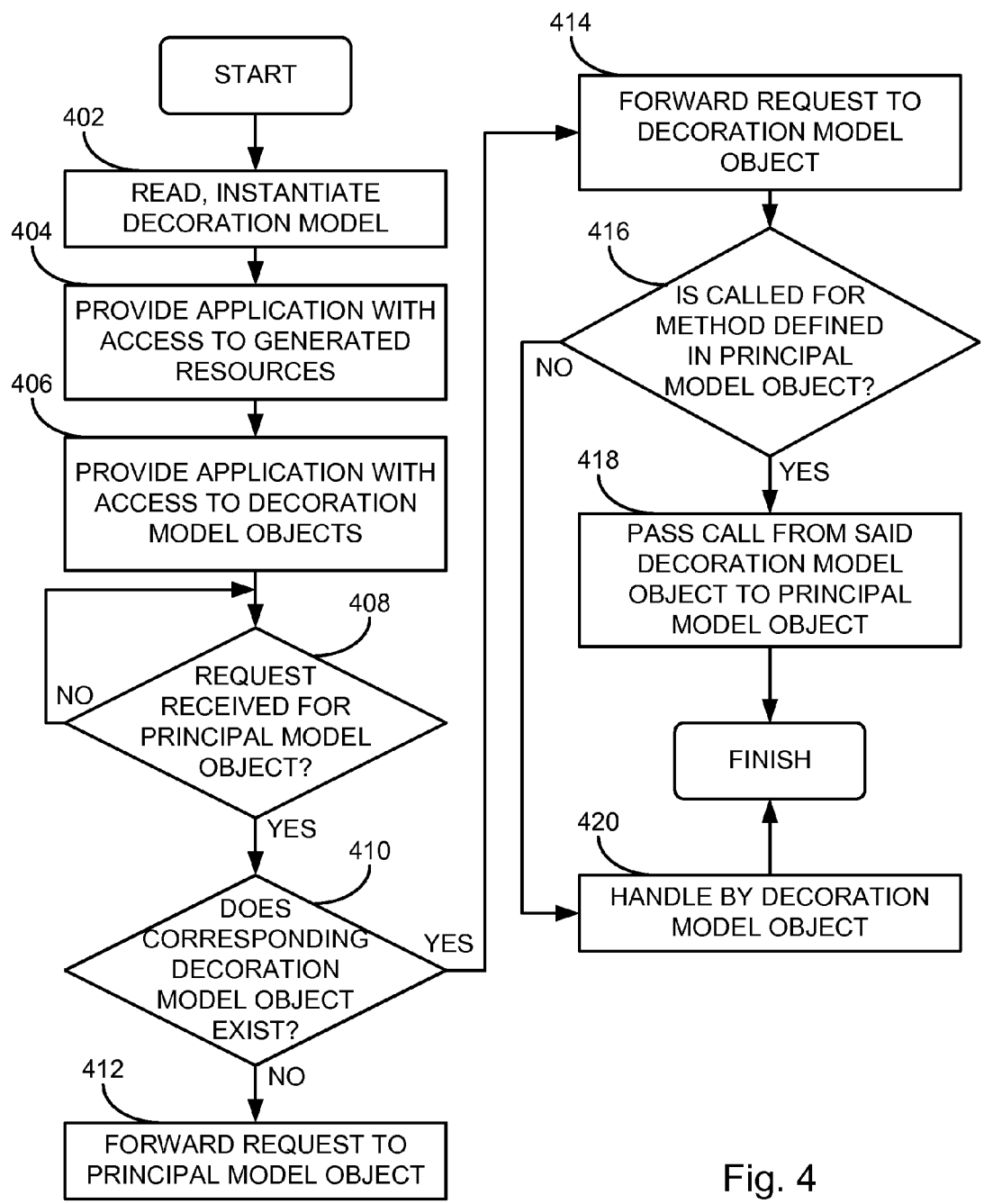
FIG. 4 is a simplified flowchart of an exemplary method of using a decoration model in an application environment, operative in accordance with an embodiment of the present invention.

Reference is now made to FIG. 4, which is a simplified flowchart of an exemplary method of using a decoration model in an application environment, operative in accordance with an embodiment of the present invention. In the method of FIG. 4, once model 100 of FIG. 1 has been prepared, and its principal model used to generate resources as described hereinabove, the decoration model is read from where it is stored and is instantiated for use by one or more computer-executable applications (steps 402, 404, 406), such as may be hosted by computer 114. When an application wishes to access an instance "EObject" of an item of the principal model (step 408), if the item has a corresponding item in the decoration model (step 410), the application accesses the corresponding instance "DObject" of the decoration model (step 414) instead of the "EObject" (step 412). Calls to methods that are defined in EObject (step 416) are passed through to EObject (step 418), while calls to methods that are defined in DObject are handled by DObject (step 420). For example, getRepresentation( ):String will return a representation based on which attribute is defined as "representation attribute" of the corresponding DObject's class in the decoration model.

Figure 5:
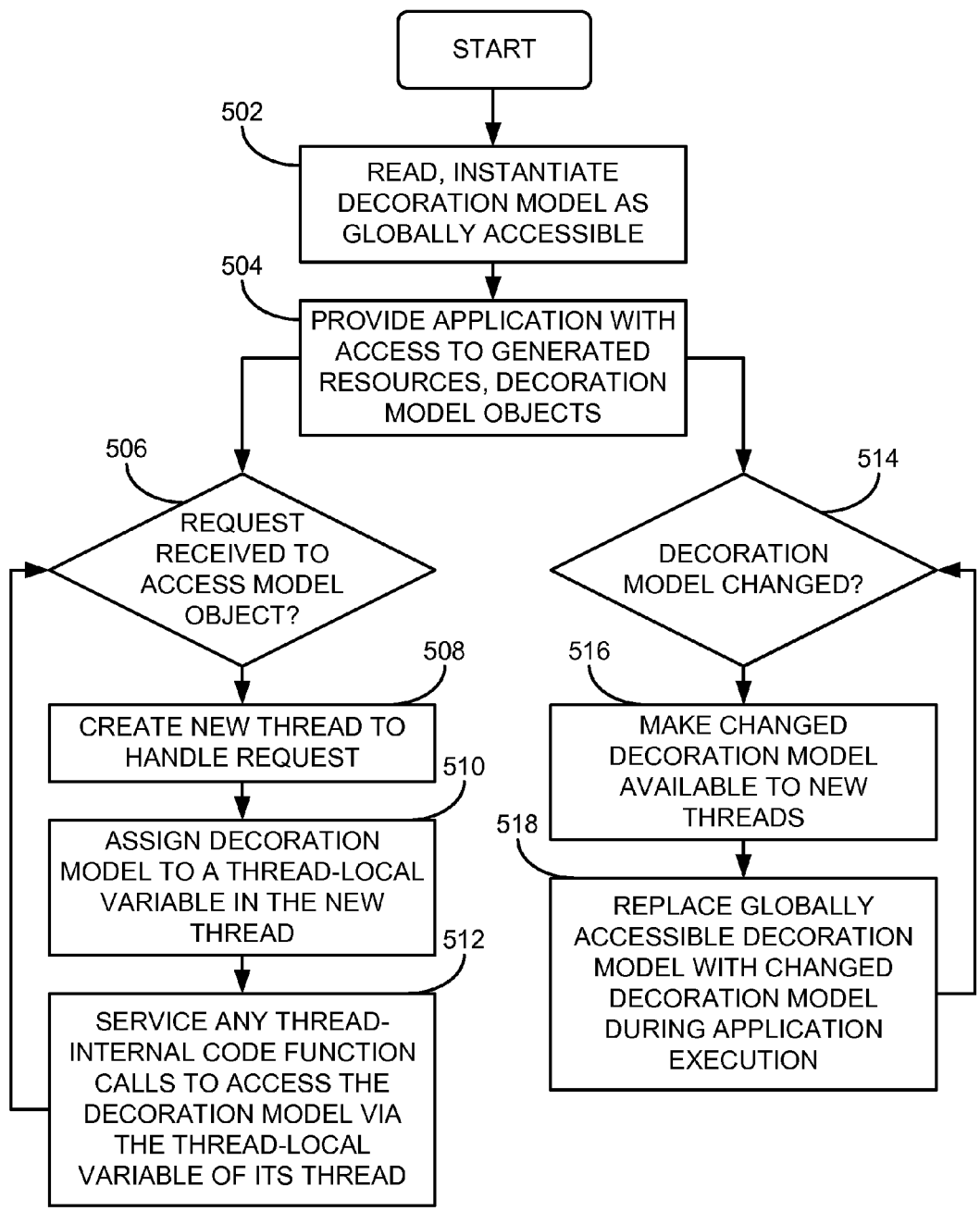
FIG. 5 is a simplified flowchart of an exemplary method of hot-deploying decoration model changes, operative in accordance with an embodiment of the present invention.

Reference is now made to FIG. 5, which is a simplified flowchart of an exemplary method of hot-deploying decoration model changes, operative in accordance with an embodiment of the present invention. In the method of FIG. 5, once model 100 of FIG. 1 has been prepared, and its principal model has been used to generate resources as described hereinabove, the decoration model is read from where it is stored and is instantiated for use by one or more computer-executable applications (step 502), such as may be hosted by computer 114. The instantiated decoration model is preferably made globally accessible (step 504). For each request by an application to access an object associated with either the principal model or the decoration model (step 506), a new thread is preferably created to handle the request (step 508). The decoration model is preferably assigned to a thread-local variable in the new thread (step 510), and all thread-internal code function calls to access the decoration model do so via the thread-local variable of its thread (step 512). Changes may be made to the decoration model (step 514) while applications that use the model are executed. The decoration model changes may be committed without impacting currently-running applications, since the previously-instantiated decoration model was globally accessible and was reused by all request threads prior to the changes being made. The changed decoration model may be made available to new threads by starting a new thread that reads the changed decoration model, instantiates the changed decoration model, and deserializes it into its own thread-local variable (step 516). This may be done without affecting other currently-running threads. The globally accessible decoration model may then be replaced by the changed model (step 518). This is preferably done using synchronization and isolation techniques, where new incoming requests are forced to wait until the globally accessible decoration model is replaced. Thereafter, all new requests will have the new decoration model assigned to their thread-local variable. Older requests that are still running using the old decoration model need not be disrupted, and may return and present results according to the older decoration model in their thread-local variable. Users may be warned when a model change occurs by checking for pointer equality between a thread-local variable and the globally accessible decoration model during the post-processing of a request. If the pointers are not the same, a warning may be displayed recommending that the user resubmit the request. If the server hosting the applications is restarted at any point after the decoration model is changed, the changed decoration model will preferably be in effect for all new and restarted applications.

Any of the elements and steps described hereinabove are preferably executed by or otherwise accessible to computer 114 (FIG. 1) having been configured for such purpose.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for implementing a model-driven architecture, the method comprising:
    defining a principal model having a plurality of classes, references, attributes, and associations between any of said classes, wherein said model is configured to facilitate the automatic generation of at least one resource for use by a computer-executable application, and wherein a change to said principal model subsequent to performing said automatic generation requires that said automatic generation be performed again in order to effect said change for use by said application;
    defining a decoration model having a class, reference, and attribute for any corresponding one of said primary model classes, references, and attributes, wherein a change to said decoration model subsequent to performing said automatic generation does not require that said automatic generation be performed again in order to effect said change for use by said application;
    mapping said decoration model to said principal model; and
    storing both of said models on a computer-readable medium.

2. A method according to claim 1 and further comprising defining in said principal model a class representing a package of any of said classes, references, and attributes of said decoration model.

3. A method for using a decoration model in an application environment, the method comprising:
    providing a computer-executable application with access to resources generated using a principal model;
    instantiating a decoration model associated with said principal model for use by said application;
    providing said application with access to an object of said decoration model responsive to a request by said application to access an object of said principal model where said decoration model object corresponds to said principal model object;
    making said instantiated decoration model globally accessible to a plurality of said applications;
    for each request by any of said applications to access an object associated with either said principal model or said decoration model:
        creating a new thread to handle said request;
        assigning said decoration model to a thread-local variable in said new thread; and
        servicing any thread-internal code function calls to access said decoration model object via the thread-local variable of its thread;
    making a change to said decoration model available to new threads by starting a new thread that reads said changed decoration model, instantiating said changed decoration model, and deserializing said changed decoration model into its own thread-local variable; and
    replacing said globally accessible decoration model with said changed decoration model while any of said applications are executed.

4. The method according to claim 3 and further comprising:
    forcing any new incoming requests from said applications to wait until said globally accessible decoration model is replaced by said changed model; and
    assigning said changed decoration model to thread-local variables of said new requests after said changed decoration model is instantiated.

5. The method according to claim 3 and further comprising:
    checking for pointer equality between any of said thread-local variables and said globally accessible decoration model during the post-processing of any of said requests; and
    displaying a message if said pointers are not the same.

* * * * *